United States Patent
Zeryck et al.

(10) Patent No.: US 9,372,636 B1
(45) Date of Patent: Jun. 21, 2016

(54) TIERED-STORAGE DESIGN

(71) Applicant: EMC Corporation, Hopkinton, MA (US)

(72) Inventors: Dave Zeryck, Portland, OR (US); Denis Vilfort, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 168 days.

(21) Appl. No.: 14/137,448

(22) Filed: Dec. 20, 2013

(51) Int. Cl.
  *G06F 3/06* (2006.01)
  *G06F 11/30* (2006.01)
  *G06F 11/34* (2006.01)

(52) U.S. Cl.
  CPC ............ *G06F 3/0631* (2013.01); *G06F 3/0619* (2013.01); *G06F 3/0689* (2013.01); *G06F 11/3034* (2013.01); *G06F 11/3414* (2013.01)

(58) Field of Classification Search
  CPC ..... G06F 3/061; G06F 3/0631; G06F 3/0646; G06F 3/0689; G06F 11/3034; G06F 11/3414
  See application file for complete search history.

(56) References Cited

U.S. PATENT DOCUMENTS

| | | | |
|---|---|---|---|
| 2011/0010514 A1* | 1/2011 | Benhase et al. | 711/162 |
| 2011/0138391 A1* | 6/2011 | Cho et al. | 718/102 |
| 2013/0179657 A1* | 7/2013 | Isomura et al. | 711/165 |
| 2013/0227584 A1* | 8/2013 | Greene et al. | 718/104 |
| 2013/0297869 A1* | 11/2013 | Mills et al. | 711/112 |
| 2013/0312005 A1* | 11/2013 | Chiu et al. | 718/105 |
| 2014/0032837 A1* | 1/2014 | Nagasaki et al. | 711/114 |

* cited by examiner

*Primary Examiner* — Edward Dudek, Jr.
(74) *Attorney, Agent, or Firm* — Brian J. Colandreo, Esq.; Mark H. Whittenberger, Esq.; Holland & Knight LLP

(57) ABSTRACT

A method, computer program product, and computing system for defining a storage pool for a storage system being designed that includes a plurality of storage tiers. Each storage tier has a different level of performance. A first workload is defined for the storage system, wherein the first workload includes: a first target skew factor, a first capacity requirement, and a first IOPS requirement. A first density function is generated based, at least in part, upon the first target skew factor. The first workload is applied to the storage pool, thus defining a first allocated workload. A distribution of the first IOPS requirement amongst the plurality of storage tiers included within the storage pool is determined based, at least in part, upon the first allocated workload and the first density function.

20 Claims, 5 Drawing Sheets

TIERED-STORAGE DESIGN

TECHNICAL FIELD

This disclosure relates to auto-tiering data systems and, more particularly, to the design of auto-tiering data systems.

BACKGROUND

Storing and safeguarding electronic content is of paramount importance in modern business. Accordingly, large storage systems may be utilized to protect such electronic content. Such large systems may be configured to provide auto-tiering services, wherein more frequently used data is moved to faster storage tiers and less frequently used data is moved to slower storage tiers.

Unfortunately, the design of such auto-tiering systems is complex and was often based on speculation and estimation.

SUMMARY OF DISCLOSURE

In one implementation, a computer-implemented method includes defining a storage pool for a storage system being designed that includes a plurality of storage tiers. Each storage tier has a different level of performance. A first workload is defined for the storage system, wherein the first workload includes: a first target skew factor, a first capacity requirement, and a first IOPS requirement. A first density function is generated based, at least in part, upon the first target skew factor. The first workload is applied to the storage pool, thus defining a first allocated workload. A distribution of the first IOPS requirement amongst the plurality of storage tiers included within the storage pool is determined based, at least in part, upon the first allocated workload and the first density function.

One or more of the following features may be include. The first workload may be defined based upon historical customer information. The first workload may be defined based upon default application information. One or more distribution rules that define the manner in which content is initially distributed amongst the plurality of storage tiers included within the storage pool may be defined. A second workload may be defined for the storage system being designed, wherein the second workload includes: a second target skew factor, a second capacity requirement, and a second IOPS requirement. A second density function may be generated based, at least in part, upon the second target skew factor. The second workload may be applied to the storage pool, thus defining a second allocated workload. A distribution of the second IOPS requirement amongst the plurality of storage tiers included within the storage pool may be determined based, at least in part, upon the second allocated workload and the second density function.

In another implementation, a computer program product resides on a computer readable medium and has a plurality of instructions stored on it. When executed by a processor, the instructions cause the processor to perform operations including defining a storage pool for a storage system being designed that includes a plurality of storage tiers. Each storage tier has a different level of performance. A first workload is defined for the storage system, wherein the first workload includes: a first target skew factor, a first capacity requirement, and a first IOPS requirement. A first density function is generated based, at least in part, upon the first target skew factor. The first workload is applied to the storage pool, thus defining a first allocated workload. A distribution of the first IOPS requirement amongst the plurality of storage tiers included within the storage pool is determined based, at least in part, upon the first allocated workload and the first density function.

One or more of the following features may be include. The first workload may be defined based upon historical customer information. The first workload may be defined based upon default application information. One or more distribution rules that define the manner in which content is initially distributed amongst the plurality of storage tiers included within the storage pool may be defined. A second workload may be defined for the storage system being designed, wherein the second workload includes: a second target skew factor, a second capacity requirement, and a second IOPS requirement. A second density function may be generated based, at least in part, upon the second target skew factor. The second workload may be applied to the storage pool, thus defining a second allocated workload. A distribution of the second IOPS requirement amongst the plurality of storage tiers included within the storage pool may be determined based, at least in part, upon the second allocated workload and the second density function.

In another implementation, a computing system including a processor and memory is configured to perform operations including defining a storage pool for a storage system being designed that includes a plurality of storage tiers. Each storage tier has a different level of performance. A first workload is defined for the storage system, wherein the first workload includes: a first target skew factor, a first capacity requirement, and a first IOPS requirement. A first density function is generated based, at least in part, upon the first target skew factor. The first workload is applied to the storage pool, thus defining a first allocated workload. A distribution of the first IOPS requirement amongst the plurality of storage tiers included within the storage pool is determined based, at least in part, upon the first allocated workload and the first density function.

One or more of the following features may be include. The first workload may be defined based upon historical customer information. The first workload may be defined based upon default application information. One or more distribution rules that define the manner in which content is initially distributed amongst the plurality of storage tiers included within the storage pool may be defined. A second workload may be defined for the storage system being designed, wherein the second workload includes: a second target skew factor, a second capacity requirement, and a second IOPS requirement. A second density function may be generated based, at least in part, upon the second target skew factor. The second workload may be applied to the storage pool, thus defining a second allocated workload. A distribution of the second IOPS requirement amongst the plurality of storage tiers included within the storage pool may be determined based, at least in part, upon the second allocated workload and the second density function.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
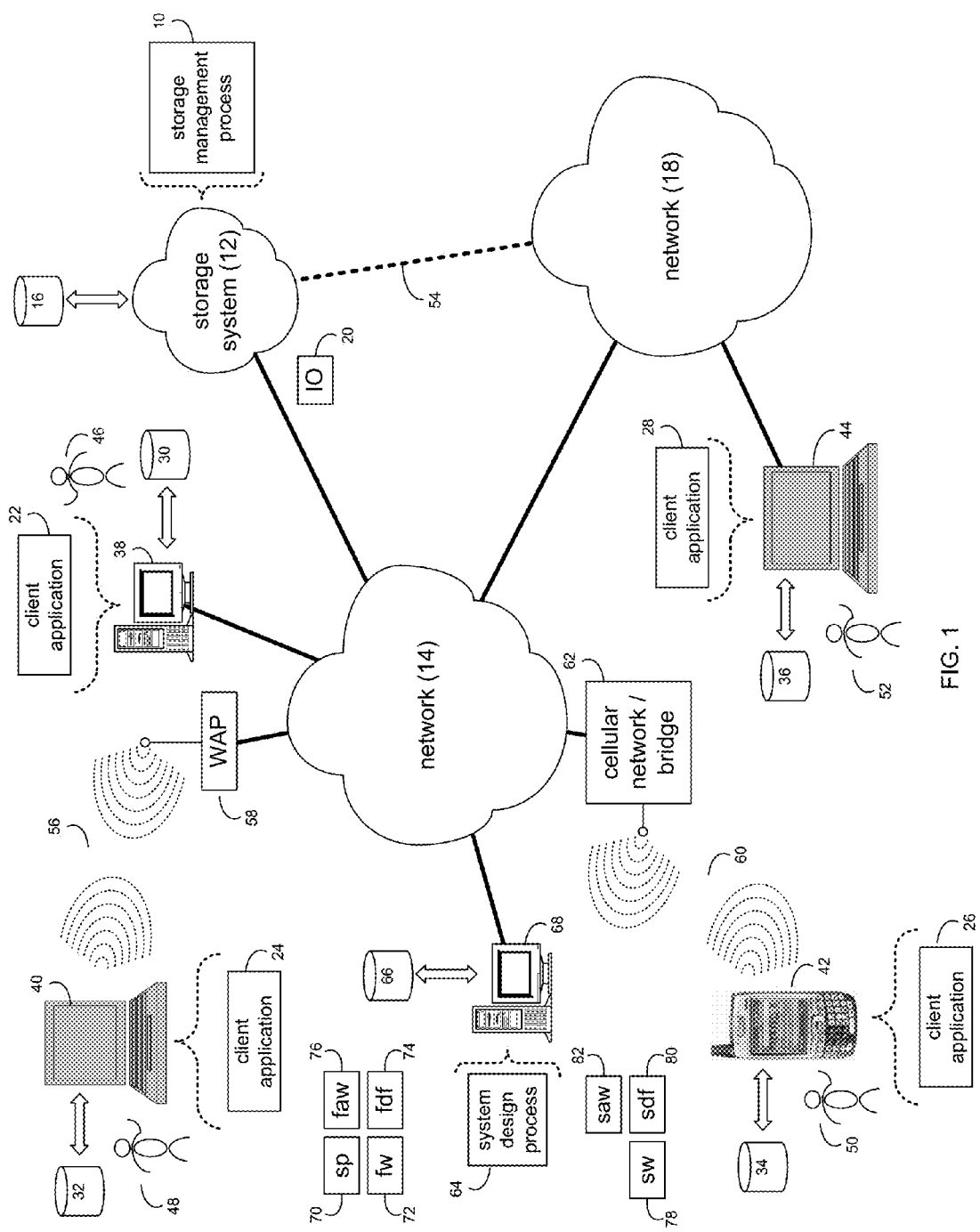
FIG. 1 is a diagrammatic view of a storage system, a storage management process, and a system design process coupled to a distributed computing network.

System Overview:

Referring to FIG. 1, there is shown storage management process 10 that may reside on and may be executed by storage system 12, which may be connected to network 14 (e.g., the Internet, a local area network, or a storage area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
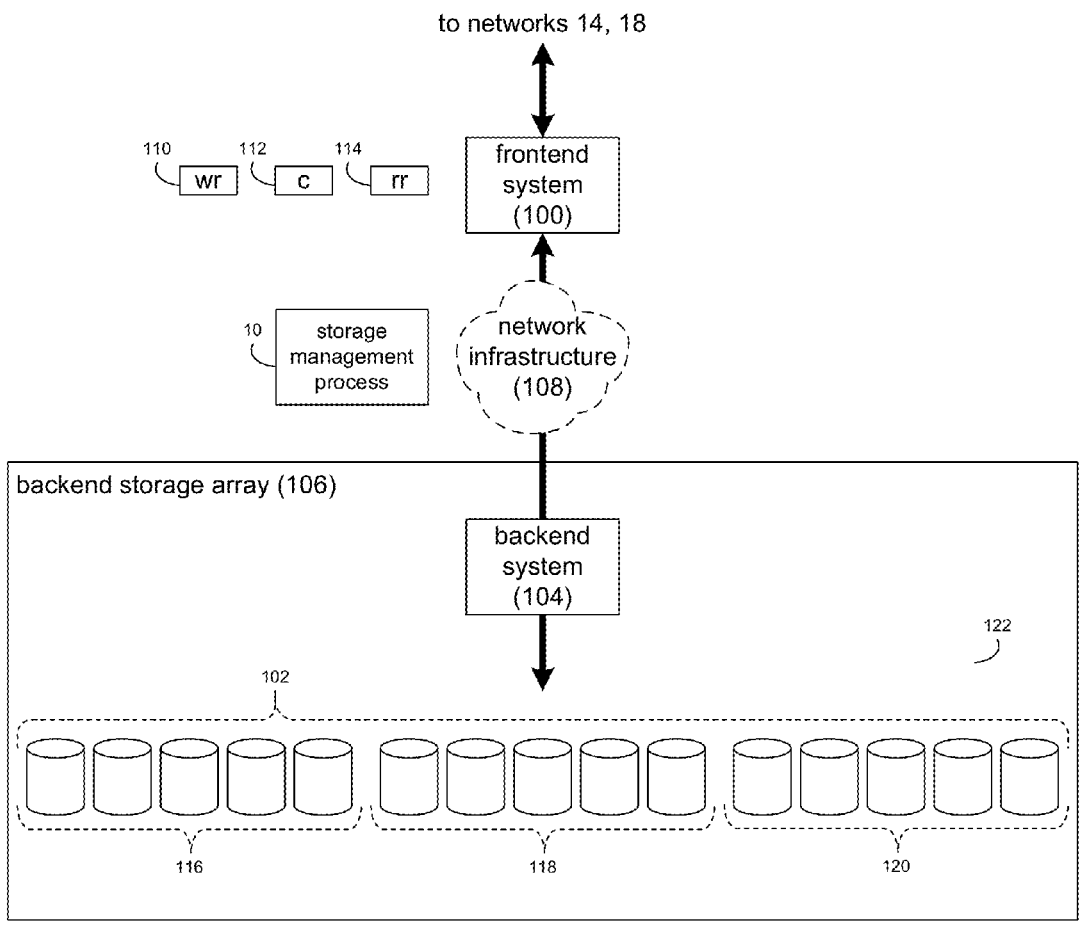
FIG. 2 is a diagrammatic view of the storage system of FIG. 1.

Referring also to FIG. 2, storage system 12 may include frontend system 100 and plurality of storage targets 102. The quantity of storage targets included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solidstate/Flash devices, wherein the combination of plurality of storage targets 102 and processing/control systems (e.g., backend system 104) may form backend storage array 106.

The manner in which storage system 12 is implemented may vary depending upon e.g. the level of redundancy/performance/capacity required. For example, storage system 12 may be a RAID device in which first frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which first frontend system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. first frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to first frontend system 100, may be executed by one or more processors (not shown) and one or more memory architectures (not shown) included within first frontend system 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when first frontend system 100 is configured as an application server, these IO requests may be internally generated within first frontend system 100. Examples of IO request 20 may include but are not limited to data write request 110 (i.e. a request that content 112 be written to storage system 12) and data read request 114 (i.e. a request that content 112 be read from storage system 12).

During operation of first frontend system 100, content 112 to be written to storage system 12 may be processed by first frontend system 100. Additionally/alternatively and when first frontend system 100 is configured as an application server, content 112 to be written to storage system 12 may be internally generated by first frontend system 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on first frontend system 100, some or all of the instruction sets and subroutines of storage management process 10 may be executed by one or more processors (not shown) and one or more memory architectures (not shown) included within backend system 104 of backend storage array 106.

Plurality of storage targets 102 may be divided into a plurality of storage tiers (e.g., storage tiers 116, 118, 120) within auto-tiering system 122, wherein each of these storage tiers may provide a different level of performance. For example, storage tier 116 within auto-tiering system 122 may utilize flash-based storage targets (and provide high-level performance); storage tier 118 within auto-tiering system 122 may utilize SAS-based storage targets (and provide mid-level performance) and storage tier 120 within auto-tiering system 122 may utilize NL/SAS-based storage targets (and provide low-level performance).

Tiered Storage Design Process:

The design and implementation of storage system 12 may be a complex task that may require the prediction of the manner in which system 12 may perform (prior to the purchase and installation of system 12). Accordingly, various design tools (e.g., system design process 64) may be utilized to design/implement storage system 12.

The instruction sets and subroutines of system design process 64, which may be stored on storage device 66 included within computing system 68, may be executed by one or more processors (not shown) and one or more memory architectures (not shown) included within computing system 68. Computing system 68 may be coupled to network 14. Storage device 66 may include but is not limited to: a hard disk drive; a tape drive; an optical drive; a RAID device; a random access memory (RAM); a read-only memory (ROM); and all forms of flash memory storage devices.

Figure 3:
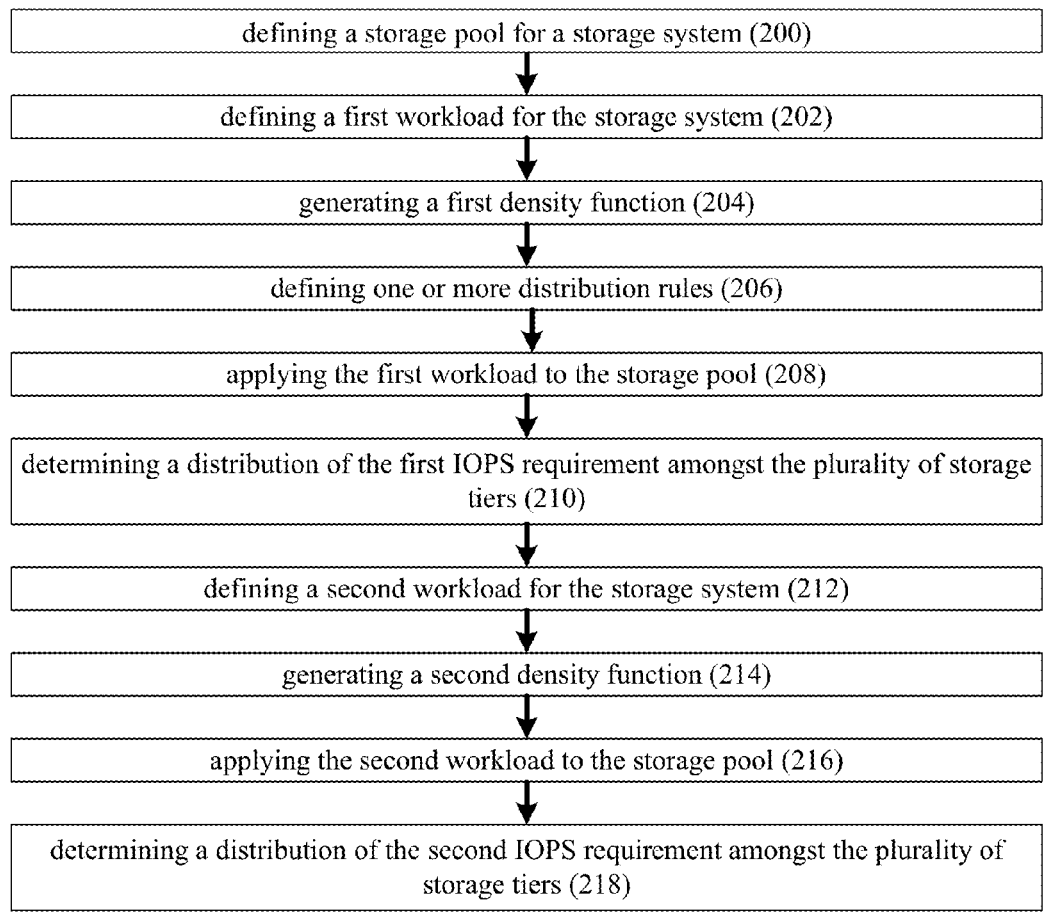
FIG. 3 is a flow chart of one implementation of the system design process of FIG. 1.

Referring also to FIG. 3, when designing a storage system (e.g., storage system 12), system design process 64 may be used to define 200 a (proposed) storage pool (e.g., storage pool 70) for a storage system (e.g., storage system 12) being designed that includes a plurality of storage tiers (e.g., storage tiers 116, 118, 120), wherein each storage tier has a different level of performance. As discussed above, storage tier 116 within auto-tiering system 122 may utilize flash-based storage targets (and provide high-level performance); storage tier 118 within auto-tiering system 122 may utilize SAS-based storage targets (and provide mid-level performance) and storage tier 120 within auto-tiering system 122 may utilize NL/SAS-based storage targets (and provide low-level performance).

An example of such storage pool 70 is illustrated in the table below:

|  | Total Capacity | Available Capacity | Fraction of Pool Capacity |
| --- | --- | --- | --- |
| Tier 1 (SSD): | 2,000 GB | 2,000 GB | 3.2% |
| Tier 2 (SAS): | 10,000 GB | 10,000 GB | 16.2% |
| Tier 3 (NLSAS): 50,000 GB | 50,000 GB | 50,000 GB | 80.6% |
| Total | 62,000 GB | 62,000 GB | 100% |

In this particular configuration, a three-tiered storage pool 70 is defined 200 and proposed for testing, having capacities of 2,000 GB, 10,000 GB, and 50,000 GB. System design process 64 may calculate the "Fraction of Pool Capacity" column, wherein 3.2% is 2,000/62,000; 16.2% is 10,000/62,000; and 80.6% is 50,000/62,000.

System design process 64 may define 202 a first workload (e.g., first workload 72) for the storage system, wherein first workload 72 includes: a first target skew factor (e.g., 70%), a first capacity requirement (e.g., 10,000 GB), and a first IOPS requirement (e.g., 10,000 IOPS).

First Target Skew Factor:

This is a metric that describes the distribution of a workload across capacity. Specifically, the first target skew factor is the relative IOPS percentage when the sum of the IOPS percentage plus the corresponding aggregate capacity percentage equals one. This concept is illustrated graphically in FIG. 4.

Figure 4:
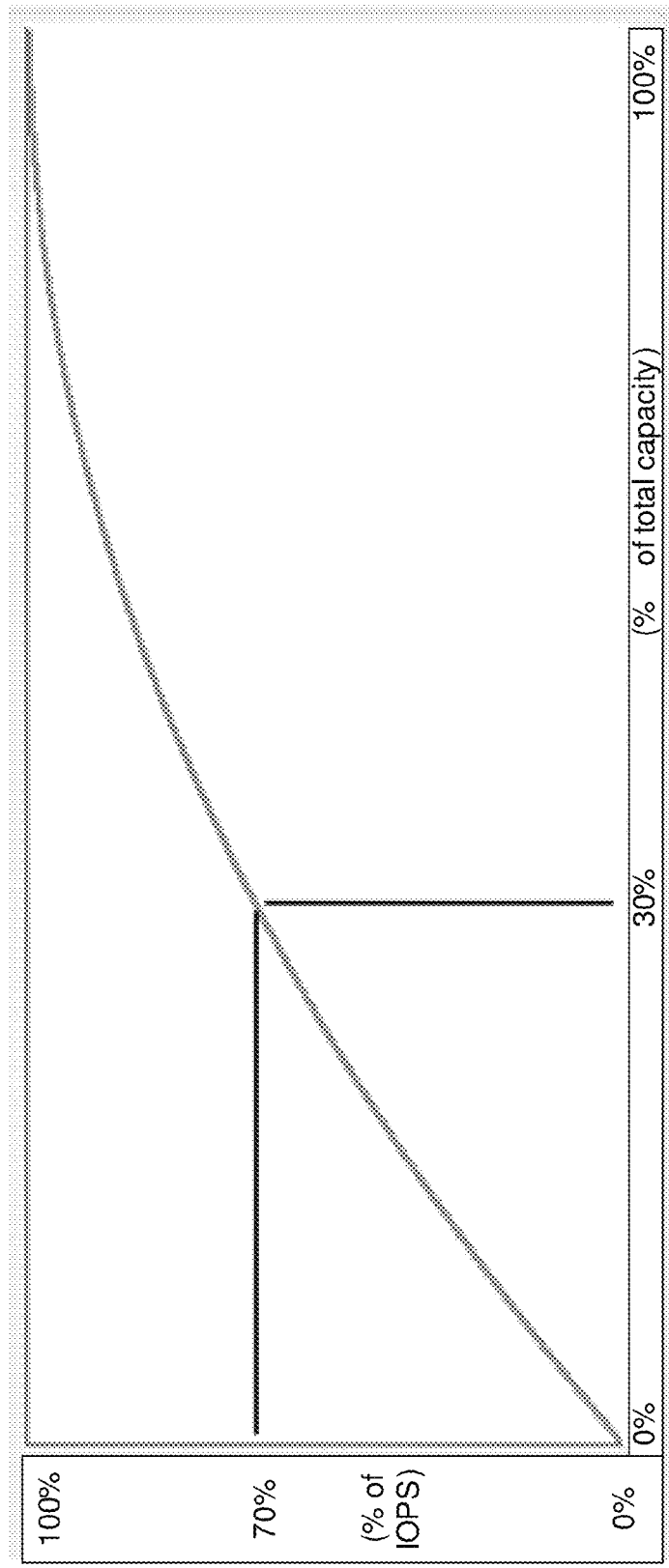
FIG. 4 is a chart illustrating skew factor with respect to IOPS.

In the chart of FIG. 4, the Skew Factor is 70.0%, as 70.0% on the Y-Axis (i.e., % of IOPS) corresponds to 30.0% on the X-Axis (i.e., % of total capacity).

First Capacity Requirement:

This factor indicates the quantity of storage capacity that the workload being tested requires.

First IOPS Requirement:

This factor indicates the number of Input/Output operations per second that the workload being tested requires.

The first workload (e.g., first workload 72) described above may be designed to simulate real-world workloads that may be placed on the system being designed (e.g., storage system 12). Accordingly, first workload 72 may be defined based upon historical customer information. For example, if the customer for which storage system 12 is being designed has a history of running a certain accounting application and they know the requirements of that accounting application and the manner in which it loads their current storage system, such data may be utilized to build first workload 72 described above, which may be processed by system design process 64.

Alternatively, first workload 72 may be defined based upon default application information. For example, if the customer for which storage system 12 is being designed is building storage system 12 to run a certain database application that they are not currently running, default information concerning this database application may be used to build first workload 72 described above, which may be processed by system design process 64.

System design process 64 may generate 204 first density function 74 that is based, at least in part, upon the above-described first target skew factor. As discussed above, the first target skew factor is the relative IOPS percentage when the sum of the IOPS percentage plus the corresponding aggregate capacity percentage equals one.

First density function 74 may be mathematically represented in the following form:

$$\sum_{i=1}^{N} f(i\varepsilon)$$

Where: $f(i\varepsilon)=1/\text{power}(i*\varepsilon,a)$; $\varepsilon$=interval value of x; x is the relative capacity value, for which we will solve a relative IOPS value; i is an iteration step being calculated; a is an exponent for which we must solve for a given skew value; and $N=1/\varepsilon$. Smaller values of $\varepsilon$ may result in higher precision, but require more computational time.

Through first density function 74, system design process 64 may determine the percentage of IOPS for any corresponding percentage of capacity, where $n\varepsilon$ represents the desired value for x (the percentage of capacity):

$$\frac{f(1\varepsilon) + f(2\varepsilon) + \ldots + f(n\varepsilon)}{\sum_{i=1}^{N} f(i\varepsilon)}$$

Figure 5:
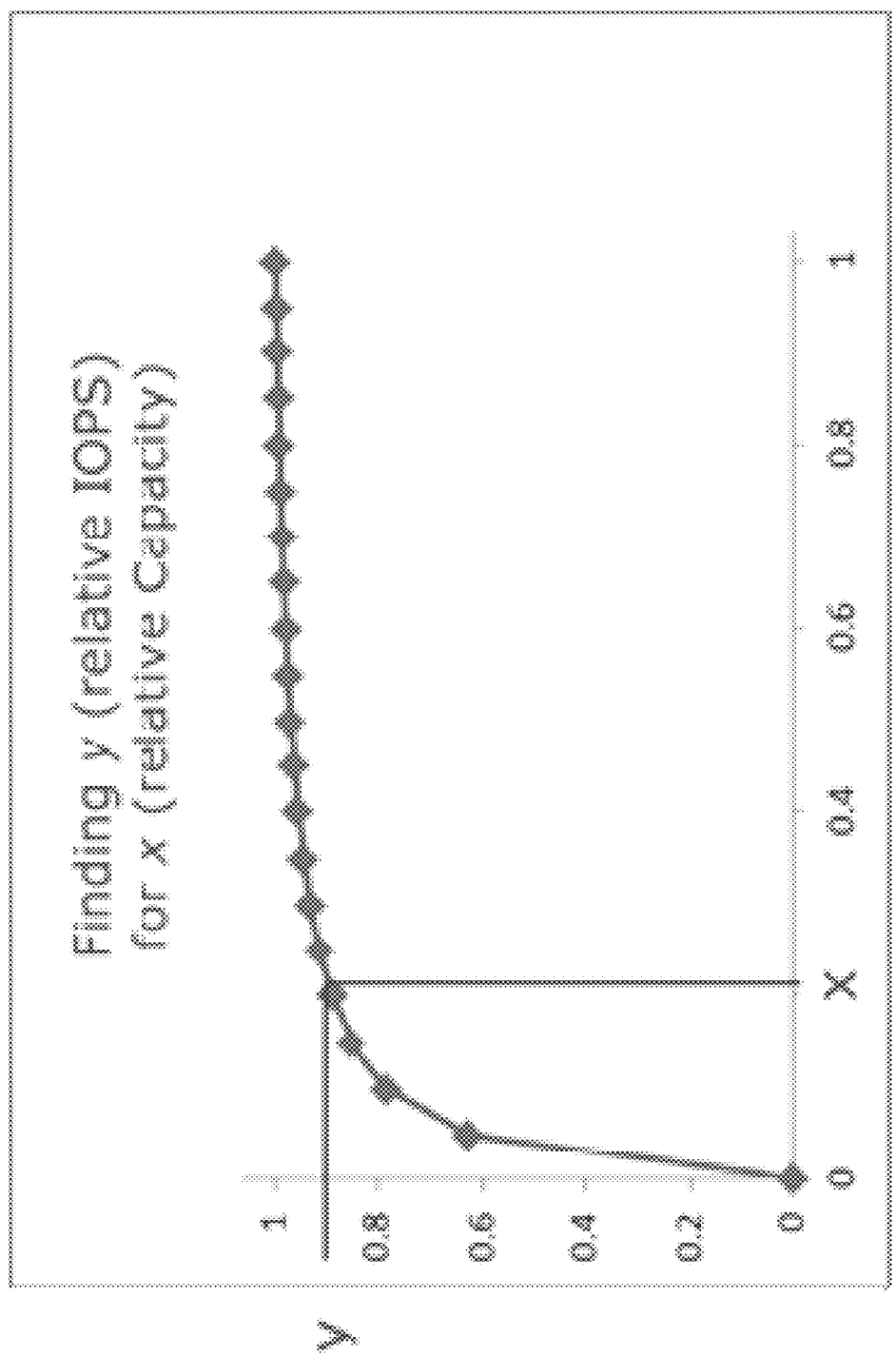
FIG. 5 is a chart illustrating relative IOPS with respect to relative capacity.

Accordingly, system design process 64 may determine the Y-axis value for a given X-axis in the density function described by $y=1/\text{power}(x,a)$, an illustrative example of which is shown in FIG. 5.

Or in summary form:

$$\frac{\sum_{i=1}^{n} f(i\varepsilon)}{\sum_{i=1}^{N} f(i\varepsilon)}$$

As discussed above, when solving the density function (e.g., first density function 74) for any given workload (e.g., first workload 72), system design process 64 may determine the exponent 'a' that results in the Y-axis value (of the point at which the sum of the IOPS percentage and the corresponding aggregate capacity percentage is equal to one) corresponding to the first target skew factor (which is defined above as being 70% for first workload 72). System design process 64 may calculate exponent 'a' iteratively (in a looping fashion) using a loop in a structured programming language, where the density function is:

$$\sum_{i=1}^{N} f(i\varepsilon)$$

wherein the value for 'a' is initially set to an arbitrarily low value (e.g., 0.01) and the density function (e.g., first density function 74) is calculated for the test value of 'a' (e.g., 0.01), thus resulting in an (x,y series). Once completed for a given test value of 'a' (e.g., 0.01), this x,y series is examined to determined the point at which the sum of the IOPS percentage (Y-axis value) and the corresponding aggregate capacity percentage (X-axis value) is equal to one. If the Y-axis value is less than the first target skew factor (which is defined above as being 70% for first workload 72), the test value of 'a' is incremented upward and above-described process is repeated until system design process 64 identifies the value of 'a' that results in the appropriate first target skew factor (which is defined above as being 70% for first workload 72).

Assume for illustrative purposes that system design process 64 iteratively determined that when the first target skew factor is 70%, then 'a' is equal to 1.05 [since the density function using the value of 'a'=1.05 results in x+y=1 where y=0.70, matching y with the desired target skew], resulting in the following table-based representation of a density function (having an interval for x [being variable $\varepsilon$] of 0.05):

| Density Function (tabular) w/'a' 1.05 | | |
| --- | --- | --- |
| x | y | x + y |
| 0.05 | 0.295 | 0.345 |
| 0.10 | 0.438 | 0.538 |
| 0.15 | 0.531 | 0.681 |
| 0.20 | 0.600 | 0.800 |
| 0.25 | 0.655 | 0.905 |
| 0.30 | 0.700 | 1.000 |
| 0.35 | 0.738 | 1.088 |
| 0.40 | 0.771 | 1.171 |
| 0.45 | 0.801 | 1.251 |
| 0.50 | 0.827 | 1.327 |
| 0.55 | 0.851 | 1.401 |
| 0.60 | 0.873 | 1.473 |
| 0.65 | 0.893 | 1.543 |
| 0.70 | 0.911 | 1.611 |
| 0.75 | 0.928 | 1.678 |
| 0.80 | 0.945 | 1.745 |
| 0.85 | 0.960 | 1.810 |
| 0.90 | 0.974 | 1.874 |
| 0.95 | 0.987 | 1.937 |

-continued

| Density Function (tabular) w/'a' 1.05 | | |
|---|---|---|
| x | y | x + y |
| 1.00 | 1.000 | 2.000 |

As first density function 74 is now known, system design process 64 may compute IOPS distribution per storage tier, defining 206 one or more distribution rules that e.g., define the manner in which content is initially distributed amongst the plurality of storage tiers included within storage pool 70. Examples, of such rules may include but are not limited to: a 'fill the fast tier first rule, a 'fill the slow tier first rule, or a "fill based on free capacity rule", wherein e.g., if the free capacity of a storage tier is 30% of the capacity of storage pool 70, then 30% of the first capacity requirement of first workload 72 may be assigned to that storage tier.

System design process 64 may apply 208 first workload 72 to storage pool 70, thus defining first allocated workload 76, which is illustrated in the table below:

| | Total Capacity | Allocated to First Workload | Available Capacity | Fraction of Pool Capacity available |
|---|---|---|---|---|
| Tier 1 (SSD): | 2,000 GB | 320 GB | 1,680 GB | 3.23% |
| Tier 2 (SAS): | 10,000 GB | 1,620 GB | 8,380 GB | 16.12% |
| Tier 3 (NLSAS): | 50,000 GB | 8,060 GB | 41,940 GB | 80.65% |
| Total | 62,000 GB | 10,000 GB | 52,000 GB | 100% |

The "Allocated to First Workload" column may be calculated by system design process 64 by determining the product of "Fraction of Pool Capacity" and the First Capacity Requirement of first workload 72 (namely 10,000 GB). Accordingly, 320 GB is equal to 3.2% of 10,000 GB; 1,620 GB is equal to 16.2% of 10,000 GB; and 8,060 GB is equal to 80.6% of 10,000 GB.

The "Available Capacity" column may be calculated by system design process 64 by subtracting "Allocated to First Workload" from "Total Capacity". Accordingly, 1,680 GB is equal to 2,000 GB–320 GB; 8,380 GB is equal to 10,000 GB–1,620 GB; and 41,940 GB is equal to 50,000 GB–8,060 GB.

The "Fraction of Pool Capacity Available" column may be calculated by system design process 64 by dividing the per storage tier "Available Capacity" by the total "Available Capacity". Accordingly, 3.23% is equal to 1,680 GB/52,000 GB; 16.12% is equal to 8,380 GB/52,000 GB; and 80.65% is equal to 41,940 GB/52,000. GB.

Now that "Fraction of Pool Capacity Available" has been determined, system design process 64 may determine 210 a distribution of the first IOPS requirement (e.g., 10,000 IOPS) amongst the plurality of storage tiers included within storage pool 72 based, at least in part, upon the first allocated workload (described above) and the first density function (described).

| Pool total capacity is 62,000 GB | Fraction of Pool Capacity Available | Cumulative Fraction for 'x' | y | Net y per Tier |
|---|---|---|---|---|
| Tier 1 (SSD) | 3.23% | 3.23% | 21% | 21% |
| Tier 2 (SAS) | 16.12% | 19.35% | 60% | 39% |
| Tier 3 (NLSAS) | 80.65% | 100.00% | 100% | 40% |

The "Cumulative Fraction for 'x'" column may be calculated by system design process 64 as the sum of the relevant storage tier and all storage tiers above the relevant storage tier. For example, the "Cumulative Fraction for 'x'" for Tier 1 is 3.23% (Tier 1 only); the "Cumulative Fraction for 'x'" for Tier 2 is 19.35%, which is 3.23%+16.12% (Tier 1+Tier 2); and the "Cumulative Fraction for 'x'" for Tier 3 is 100%, which is 3.23%+16.12%+80.65% (Tier 1+Tier 2+Tier 3).

The "Y" column may be populated by system design process 64 using density function 74 (as described above and as represented in the table above). Through the use of this density function, the Y-axis value may be found for each "Cumulative Fraction for 'x'" value. Accordingly and for x=3.23%, y=21%; for x=19.35%, y=60%; and for x=100.00%, y=100.00%.

And the "Net y per Tier" may be populated by system design process 64 as the difference between the "y" value of the relevant storage tier and the storage tier directly above the relevant storage tier. For example, the "Net y per Tier" for Tier 1 is 21%; the "Net y per Tier" for Tier 2 is 39%, which is 60%–21%, (Tier 2–Tier 1); and the "Net y per Tier" for Tier 3 is 40%, which is 100%–60% (Tier 3–Tier 2).

Accordingly, system design process 64 may summarize the above-described capacity/IOPS distribution information as follows:

| Tiers | First Workload Capacity | First Workload IOPS |
|---|---|---|
| Tier 1 (SSD): | 323 GB | 2100 |
| Tier 2 (SAS): | 1,612 GB | 3900 |
| Tier 3 (NLSAS) | 8,065 GB | 4000 |
| Totals | 10,000 GB | 10000 |

The "First Workload Capacity" column may be calculated by system design process 64 as the product the "Fraction of Pool Capacity Available" and the First Capacity Requirement of first workload 72 (namely 10,000 GB). For example, the "First Workload Capacity" for Tier 1 is 323 GB (namely 3.23% times 10,000 GB); the "First Workload Capacity" for Tier 2 is 1,612 GB (namely 16.12% times 10,000 GB); and the "First Workload Capacity" for Tier 3 is 8,065 GB (namely 80.65% times 10,000 GB).

The "First Workload IOPS" column may be calculated by system design process 64 as the product of the "Net y per Tier" and the First IOPS Requirement of first workload 72 (namely 10,000 IOPS). For example, the "First Workload Capacity" for Tier 1 is 2,100 IOPS (namely 21% times 10,000 IOPS); the "First Workload Capacity" for Tier 2 is 3,900 IOPS (namely 39% times 10,000 IOPS); and the "First Workload Capacity" for Tier 3 is 4,000 IOPS (namely 40% times 10,000 IOPS).

System design process 64 may repeat the above-described process for additional workloads. Accordingly, system design process 64 may define 212 a second workload (e.g., second workload 78) for the storage system (e.g., storage system 12) being designed, wherein second workload 78 includes: a second target skew factor (e.g., 85%), a second capacity requirement (e.g., 15,000 GB), and a second IOPS requirement (e.g., 5,000 IOPS). System design process 64 may generate 214 a second density function (e.g., second density function 80) based, at least in part, upon the second target skew factor (e.g., 85%) and variable $\epsilon$, resulting in 'a' having a value of 1.98. System design process 64 may apply 216 second workload 78 to storage pool 70, thus defining second allocated workload 82. System design process 64 may then determine 218 a distribution of the second IOPS requirement amongst the plurality of storage tiers included within storage pool 70 based, at least in part, upon second allocated workload 82 and second density function 80.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
defining a storage pool for a storage system being designed that includes a plurality of storage tiers, wherein each storage tier has a different level of performance;
defining a first workload for the storage system, wherein the first workload includes:
a first target skew factor, wherein the first target skew factor is a relative Input/Output operations per second (IOPS) percentage when a sum of the IOPS percentage plus a corresponding aggregate capacity percentage equals one,
a first capacity requirement, and
a first IOPS requirement;
generating a first density function based, at least in part, upon the first target skew factor;
applying the first workload to the storage pool, thus defining a first allocated workload; and
determining a distribution of the first IOPS requirement amongst the plurality of storage tiers included within the storage pool based, at least in part, upon the first allocated workload and the first density function.

2. The computer-implemented method of claim 1 wherein the first workload is defined based upon historical customer information.

3. The computer-implemented method of claim 1 wherein the first workload is defined based upon default application information.

4. The computer-implemented method of claim 1 further comprising:
defining one or more distribution rules that define the manner in which content is initially distributed amongst the plurality of storage tiers included within the storage pool.

5. The computer-implemented method of claim 1 further comprising:
defining a second workload for the storage system being designed, wherein the second workload includes:
a second target skew factor,
a second capacity requirement, and
a second IOPS requirement; and
generating a second density function based, at least in part, upon the second target skew factor.

6. The computer-implemented method of claim 5 further comprising:
applying the second workload to the storage pool, thus defining a second allocated workload.

7. The computer-implemented method of claim 6 further comprising:
determining a distribution of the second IOPS requirement amongst the plurality of storage tiers included within the storage pool based, at least in part, upon the second allocated workload and the second density function.

8. A computer program product residing on a non-transitory computer readable medium having a plurality of instructions stored thereon which, when executed by a processor, cause the processor to perform operations comprising:
defining a storage pool for a storage system being designed that includes a plurality of storage tiers, wherein each storage tier has a different level of performance;
defining a first workload for the storage system, wherein the first workload includes:
a first target skew factor, wherein the first target skew factor is a relative Input/Output operations per second (IOPS) percentage when a sum of the IOPS percentage plus a corresponding aggregate capacity percentage equals one,
a first capacity requirement, and
a first IOPS requirement;
generating a first density function based, at least in part, upon the first target skew factor;
applying the first workload to the storage pool, thus defining a first allocated workload; and
determining a distribution of the first IOPS requirement amongst the plurality of storage tiers included within the storage pool based, at least in part, upon the first allocated workload and the first density function.

9. The computer program product of claim 8 wherein the first workload is defined based upon historical customer information.

10. The computer program product of claim 8 wherein the first workload is defined based upon default application information.

11. The computer program product of claim 8 further comprising instructions to perform operations including:
defining one or more distribution rules that define the manner in which content is initially distributed amongst the plurality of storage tiers included within the storage pool.

12. The computer program product of claim 8 further comprising instructions to perform operations including: defining a second workload for the storage system being designed, wherein the second workload includes: a second target skew factor, a second capacity requirement, and a second IOPS requirement; and generating a second density function based, at least in part, upon the second target skew factor.

13. The computer program product of claim 12 further comprising instructions to perform operations including:
applying the second workload to the storage pool, thus defining a second allocated workload.

14. The computer program product of claim 13 further comprising instructions to perform operations including:
determining a distribution of the second IOPS requirement amongst the plurality of storage tiers included within the storage pool based, at least in part, upon the second allocated workload and the second density function.

15. A computing system including a processor and memory configured to perform operations comprising:
defining a storage pool for a storage system being designed that includes a plurality of storage tiers, wherein each storage tier has a different level of performance;
defining a first workload for the storage system, wherein the first workload includes:
a first target skew factor, wherein the first target skew factor is a relative Input/Output operations per second (IOPS) percentage when a sum of the IOPS percentage plus a corresponding aggregate capacity percentage equals one,
a first capacity requirement, and
a first IOPS requirement;

generating a first density function based, at least in part, upon the first target skew factor;

applying the first workload to the storage pool, thus defining a first allocated workload; and determining a distribution of the first IOPS requirement amongst the plurality of storage tiers included within the storage pool based, at least in part, upon the first allocated workload and the first density function.

16. The computing system of claim 15 wherein the first workload is defined based upon historical customer information.

17. The computing system of claim 15 wherein the first workload is defined based upon default application information.

18. The computing system of claim 15 further configured to perform operations comprising:

defining one or more distribution rules that define the manner in which content is initially distributed amongst the plurality of storage tiers included within the storage pool.

19. The computing system of claim 15 further configured to perform operations comprising:

defining a second workload for the storage system being designed, wherein the second workload includes:

a second target skew factor, a second capacity requirement, and a second IOPS requirement; and generating a second density function based, at least in part, upon the second target skew factor.

20. The computing system of claim 19 further configured to perform operations comprising:

applying the second workload to the storage pool, thus defining a second allocated workload; and determining a distribution of the second IOPS requirement amongst the plurality of storage tiers included within the storage pool based, at least in part, upon the second allocated workload and the second density function.

* * * * *